(12) United States Patent
Floreancig

(10) Patent No.: US 11,050,379 B1
(45) Date of Patent: Jun. 29, 2021

(54) CIRCUIT AND METHOD FOR START OF SINGLE PHASE TO THREE PHASE CONVERSION SYSTEM

(71) Applicant: Applied Industrial Motors, LLC, Phoenix, AZ (US)

(72) Inventor: Glen Floreancig, Phoenix, AZ (US)

(73) Assignee: Applied Industrial Motors, LLC, Phoenix, AZ (US)

( * ) Notice: Subject to any disclaimer, the term of this patent is extended or adjusted under 35 U.S.C. 154(b) by 0 days.

(21) Appl. No.: 16/724,629

(22) Filed: Dec. 23, 2019

Related U.S. Application Data

(60) Provisional application No. 62/788,046, filed on Jan. 3, 2019.

(51) Int. Cl.
*H02P 1/00* (2006.01)
*H02P 27/00* (2006.01)
*H02M 5/04* (2006.01)

(52) U.S. Cl.
CPC .............. *H02P 27/00* (2013.01); *H02M 5/04* (2013.01)

(58) Field of Classification Search
CPC ............ H02P 27/00; H02M 5/04; H02M 1/36
See application file for complete search history.

(56) References Cited

U.S. PATENT DOCUMENTS

2013/0043686 A1* 2/2013 Eitan ....................... F03D 15/10
290/55
2016/0308472 A1* 10/2016 Floreancig ................ H02P 1/30

* cited by examiner

*Primary Examiner* — Karen Masih
(74) *Attorney, Agent, or Firm* — Venjuris P.C.

(57) ABSTRACT

A circuit for converting single phase power to three phase power and method of operation that automatically starts upon detection of a demand for three phase power from a three phase load connected to the circuit.

20 Claims, 5 Drawing Sheets

CIRCUIT AND METHOD FOR START OF SINGLE PHASE TO THREE PHASE CONVERSION SYSTEM

FIELD OF THE INVENTION

The present invention relates to single phase power to three phase power conversion and circuits and methods for conserving power.

BACKGROUND OF THE INVENTION

Three phase power is preferred over single phase power for large power applications. Often however, only single phase power is available and three phase power must be generated from the single phase source. One such circuit and method of creating three phase power is the single phase to three phase converter circuit illustrated in FIG. 1.

Three phase power may be generated by use of a three phase converter idler motor to generate three phase VAC power at the three phase motor terminals. A single phase VAC supply, comprised of a hot leg and neutral conductor, is coupled to two of the three phase converter motor terminals, and one or more a phase-shift capacitors may be used between the hot leg and the third leg or phase of the three phase converter idler motor terminal. Moreover, a start capacitance ("S") may be temporarily switched, such as by a normally-open push-switch ("NOS"), in parallel with a run capacitor "R" to start the three phase converter motor until the three phase motor has started as signified by sufficient voltage generated on the third terminal. Three phase power generated from the converter motor can then be used for one or more three phase power applications, such as tools, pumps, elevators, air compressors, fire alarms, air conditioners or other devices that require three phase power.

One shortcoming of the above solution however is that the process of powering-up three phase power applications requires the sequential and manual powering-up of two circuits; first, the single phase to three phase converter circuit must be started, and then once sufficient three phase power is generated on the idler motor terminals, the three phase power application or load switched to the idler motor terminals. Moreover, if the three phase power application must be switched-on remotely or by another non-manual process such as by a sensor application, then the single phase to three phase converter circuit must be run constantly to ensure that three phase power is available upon demand. Running the single phase to three phase converter circuit constantly however wastes power and unnecessary wear and tear. Instead, it would be advantageous to avoid wasting power only enable the single phase to three phase converter circuit when the load demands power or when necessary.

SUMMARY OF THE INVENTION

Aspects of the disclosed circuit and method may be incorporated in a circuit and method to create an automatic-starting or self-starting single phase to three phase converter circuit. The invention may be incorporated in a system or circuit and method for generating three phase power from single phase power upon detection of a demand for three phase power.

Aspects of the invention include the use of single phase power supplied to a three phase load to generate energy, power, voltage, or current on at least one phase or leg of the load, such as the third leg or phase on the load. Aspects also include detecting the load or energy demand from the load such as by detecting the power demand on the first or second phase or the generation of power or current on the third phase. Another aspect includes that the system will temporarily disconnect or switch the load out of the circuit, subsequently connecting the single phase power to an idler motor, which may include connecting run and start capacitors as required to start a three phase generator or idler motor, and subsequently enabling a contactor to connect the three phase idler motor to the three phase load once the system senses that the third phase of the generator motor is running at sufficient voltage.

An object of the invention is to create a three phase power converter circuit. Aspects of the three phase power converter circuit include a single phase power input, a three phase load switch with first, second, and third load switch input and output terminals and a load switch control terminal, the first, second, and third load switch input terminals coupled to the single phase power input. The circuit further includes an idler motor switch with first, second, and third phase idler motor switch input terminals and output terminals and an idler motor switch control terminal, the first, second, and third phase idler motor switch input terminals coupled to the single phase power input, and the first, second, and third phase idler motor switch output terminals connectable to first, second, and third phase terminals of the idler motor. The circuit further includes a sensor coupled to at least one of the first, second, and third load switch output terminals, the sensor configured to detect load power demand on at least one of the first, second, and third load switch output terminals. The circuit further includes a first control signal that is operatively coupled to the load switch control terminal and a second control signal that is operatively coupled to the idler motor switch control terminal. During operation, the first control signal opens the load switch to disconnect, and closes the load switch to connect, a three phase load connectable to the three phase converter circuit, and the second control signal opens idler motor switch to disconnect, and closes the idler motor switch to connect, the idler motor to the three phase converter circuit.

Aspects of the invention comprise a circuit wherein the first control signal is an output of a first relay and the second control signal is an output of a second relay. Moreover, the first relay may be a timing relay and the second relay may be a current sensing relay. Alternatively, the first control signal may be an output of a processor operatively coupled to the idler motor switch control terminal to open and close said switch. The sensor may be implemented by a current sensing relay that includes a current transformer that is operatively coupled to one of the first, second, and third load switch input and output terminals. Objects of the circuit include creation of a conversion circuit with different operating states depending on the presence of a load power demand and may be implemented with a load switch that is a first three pole switch with a closed state and the idler motor switch is a second three pole switch with an open state; the load switch may be a first three pole switch with an open state and the idler motor switch is a second three pole switch with an closed state; or the load switch may be a first three pole switch with an closed state and the idler motor switch is a second three pole switch with an closed state.

Objects also include making a three phase converter circuit for auto-starting an idler motor. The circuit may include a single phase power input, a three phase load switch with first, second, and third load switch input and output terminals and a load switch control terminal, the first, second, and third load switch input terminals coupled to the single phase power input. The circuit may include an idler motor switch with first, second, and third phase idler motor switch input terminals and output terminals and an idler motor switch control terminal, the first, second, and third phase idler motor switch input terminals coupled to the single phase power input, the first, second, and third phase idler motor switch output terminals connectable to first, second, and third phase terminals of the idler motor. The circuit may include a sensor coupled to at least one of the first, second, and third load switch output terminals, the sensor configured to indicate change in load power demand on at least one of the first, second, and third load switch output terminals. The circuit may include a switch control circuit operatively coupled to the sensor, the load switch control terminal, and the idler motor switch control terminal and wherein the switch control circuit opens the load switch to disconnect, and closes the load switch to connect, a three phase load that may be connected to the three phase converter circuit, and closes the idler motor switch to connect, the idler motor that may be connected to the three phase converter circuit.

The converter circuit may operate in a first state and a second state, the first state comprising the three phase load switch closed and the idler motor switch open, the second state comprising three phase load switch closed and the idler motor switch closed.

It is a further object to enable a method or process of converting single phase power to three phase power. The method may include detecting a power demand on at least one of first, second, or third phase conductors that are connectable to a three phase load, disconnecting the three phase load upon detection of the demand for power, starting an idler motor after disconnecting the three phase load; and connecting the three phase load after starting the idler motor. The step of disconnecting may comprise opening a load switch electrically coupled between the single phase power source and the three phase load. The step of detecting may comprise sensing current through a current transformer operationally coupled to at least one of first, second, or third phase conductors. The method of starting may comprise closing a idler motor switch current electrically coupled between the single phase power source and an idler motor. The step of connecting may comprise closing a load switch electrically coupled between the single phase power source and the three phase load. And, the method may further include detecting an absence of power demand on at least one of first, second, or third phase conductors that are connectable to a three phase load, stopping the idler motor.

Further optional object include use of the self-starting phase converter system with wireless technologies such as Bluetooth and/or Wi-Fi and Internet protocols, enabling remote or automated start, control, or reporting capabilities of a variety of system capabilities and parameters. Additionally, the processing and connectivity of the self-starting phase converter allows remote monitoring of energy usage, management, and failures or troubleshooting. Numerous other advantages and features of the present invention will become readily apparent from the following detailed description of the invention and the embodiments thereof, from the claims and from the accompanying drawings.

BRIEF DESCRIPTION OF THE DRAWINGS

The figures illustrate embodiments incorporating certain aspects of the invention.

Figure 1:
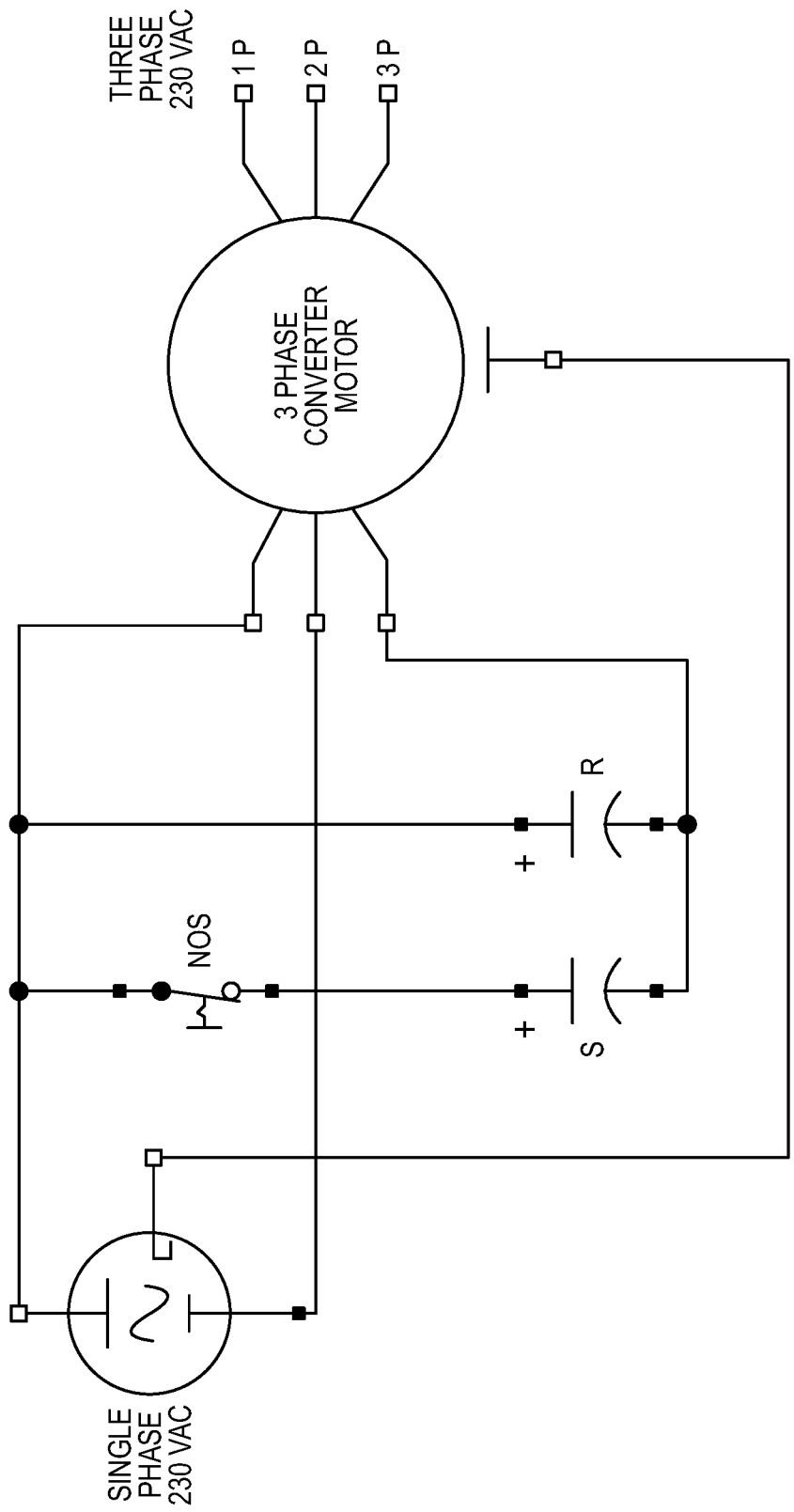
FIG. 1 illustrates a prior art single phase to three phase converter circuit.

The objects, features and advantages of the present invention will be more readily appreciated upon reference to the following disclosure when considered in conjunction with the accompanying drawings, wherein reference numerals are used to identify the components in the various views.

DESCRIPTION OF PREFERRED EMBODIMENTS

The figures illustrate embodiments implementing aspects of an auto-start or self-start single phase to three phase converter circuit according to the description and drawings. The single phase to three phase converter circuit may be implemented in one or more embodiments and methods comprising substantial equivalents to those described herein. In summary, the converter circuit and method described herein may be included or adapted for any application wherein a three phase powered load must be powered from a single phase power source. In such applications, it is common that three phase power is generated such as by the prior art circuit in FIG. 1 wherein three phase power is generated by application of the single phase power to a three phase converter or idler motor and three phase power tapped from the idler motor terminals after the three phase idler motor has been started and is running at a steady state speed. Once the generated three phase power of the idler motor is sufficient, the three phase load may be electrically coupled to the three phase converter motor terminals. The operation described however requires that the user start the prior art single phase to three phase converter before switching on or otherwise coupling the three phase load. Otherwise, in order for generated three phase power to be available when needed, the prior art single phase to three phase converter must be left continually running at the expense of wasted power to run the three phase converter motor and unneeded wear and tear on the motor and other electrical components.

Figure 2:
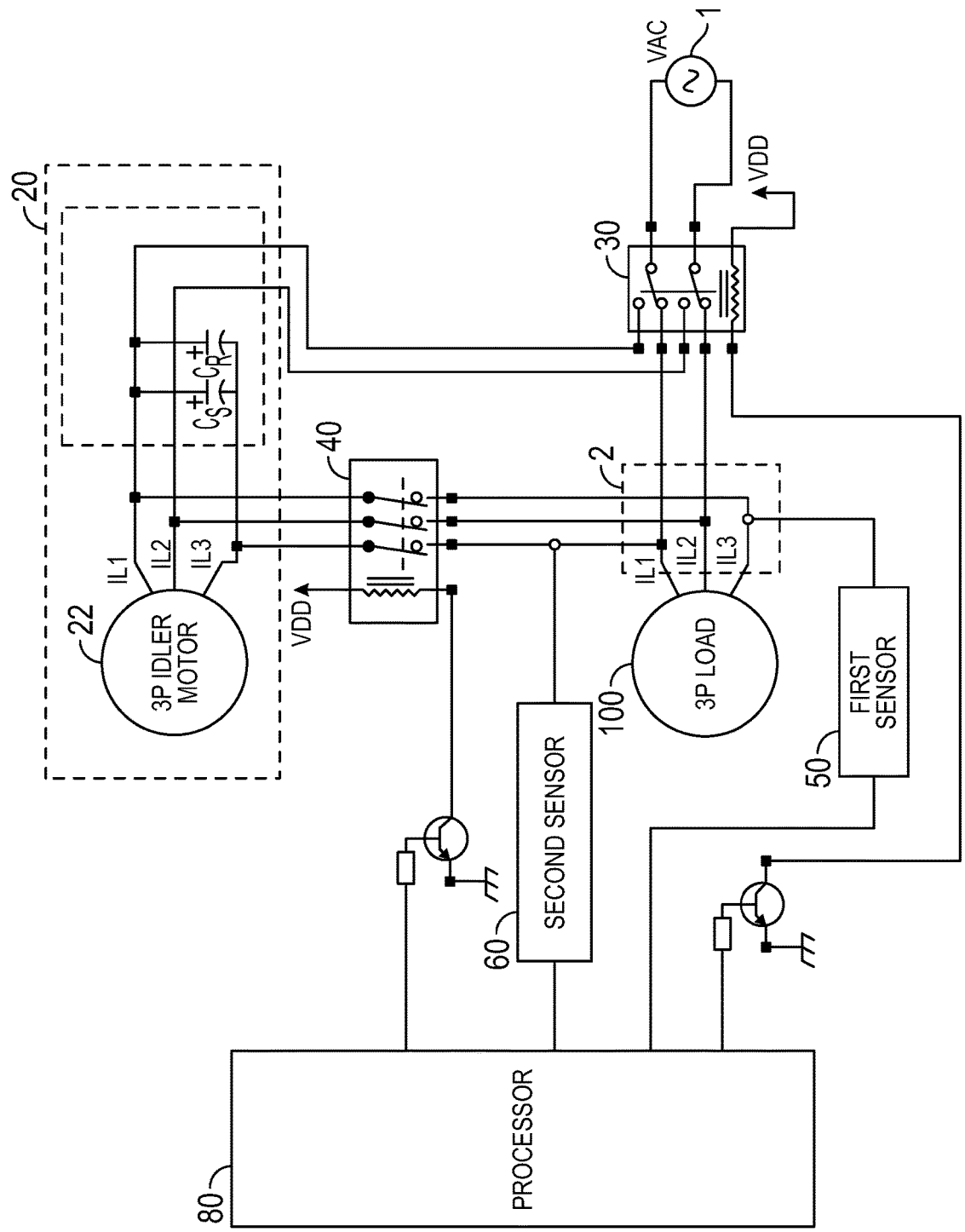
FIG. 2 illustrates a first embodiment including aspects of the disclosure.

The self-starting phase converter circuit and method described herein solves the above problem by detecting the demand for three phase power from a three phase load, switching on the self-starting phase idler motor in response to the demand for three phase power, and then sourcing power to the three phase load from the idler motor. The circuit and method may be adapted to provide sufficient and reliable three phase power to any of a variety of three phase loads. In certain embodiments, the self-starting phase converter is comprised of passive and active circuitry whether in integrated or discrete form. In other embodiments, the self-starting phase converter may also be comprised of a processor with one or more software processes that control operation of the self-starting phase converter, or that are functionally enabled for remote reporting or control. Accordingly, the following described embodiments should not be construed as a limit on the scope of the description or claims to be included in one or more follow up applications claiming benefit of this application.

A block diagram of a first embodiment of the self-starting phase converter is illustrated in FIG. 2. The self-starting phase converter illustrated incorporates a processor to monitor circuit parameters and execute control operations of one or more circuit components or sub circuits. Generally, the embodiment comprises a complete self-starting single phase to three phase converter system comprised of single phase power 1 connected to the system input and a generated three phase power output 2. Single phase power 1 is connectable to the single phase power input and a three phase load 100 is connectable to the generated three phase power output 2. Generated three phase power is sourced from the generated three phase power output 2 to operate or power the three phase load 100.

Three phase power from the generated three phase power output 2 is generated from applying single phase power to the three phase idler motor 22. The single phase to three phase idler motor 22 includes three electrical connections IL1, IL2, and IL3 corresponding to the legs or phases of the three phase idler motor. At least two of the three phase idler motor connections IL1, IL2, and IL3 are coupled to the single phase power input 1 through an electrical path that includes at least a first switch 30. The first switch 30 switches the current path or power from the single phase power 1 to either the three phase power output 2 or the three phase converter motor 22. The three phase idler motor connections IL1, IL2, and IL3 are also coupled to the generated three phase power output 2 through a current path that includes at least a second switch 40. The second switch 40 opens or closes the current path between the three phase converter motor terminals and the generated three phase power output 2. Moreover, a first sensor 50 and an optional second sensor 60 may be coupled to the generated three phase power output 2.

Operation of the self-starting phase converter commences upon detection of a demand for three phase power from the three phase load 100. The presence of power demand, current flow, or a very low resistance (such as for example by starting, enabling, or switching on a three phase motor comprising the three phase load 100) at the three phase power output 2 causes single-phase current or power to flow through the first switch 30 to the three phase load 100. The flow of single phase power to the three phase load 100 may be detected by the first sensor 50 and as a result, the flow of current to the three phase load 100 diverted away from the three phase load 100, by the processor 80 controlling the first switch 30, to start and run the three phase idler motor 22. The application of single phase power 1 to the three phase idler motor input 22 modified by start and run capacitors as is common in the art causes the single phase to three phase converter motor 22 to start resulting in the generation of three phase power at the three phase converter motor terminals, IL1, IL2 and IL3. Thereafter, the second switch 40 may be closed by the processor 80 to source generated three phase power from the three phase idler motor 22 terminals to the three phase load 100. It is noted that the first sensor 50 is may be coupled to any of the legs or phases of the three phase load 100, including the third phase In such cases, the starting of the three phase load 100 with single phase power will generate voltage and current on the third phase, which may be detected by the first sensor 50. It is further noted that the first sensor 50 may also or alternately be coupled to the conductors comprising the first or second phases as these will also draw power or current detectable by a first sensor 50 upon a start of the three phase load 100.

The above described embodiment comprises a block-diagram level implementation from which concepts, aspects, or objects can be extracted to create practical implementations. For example, there are many alternate switches, relays, and contactors that could be used in embodiments depending on designer choice or system demands, and one or more functions could be implemented in software or hardware, or in a combination of software and hardware. Thus, the described embodiment is but one of many alternate implementations that adapt the concepts described in the block-diagram level embodiment to a practical implementation as would be appreciated by a person in the field or industry.

Figure 3:
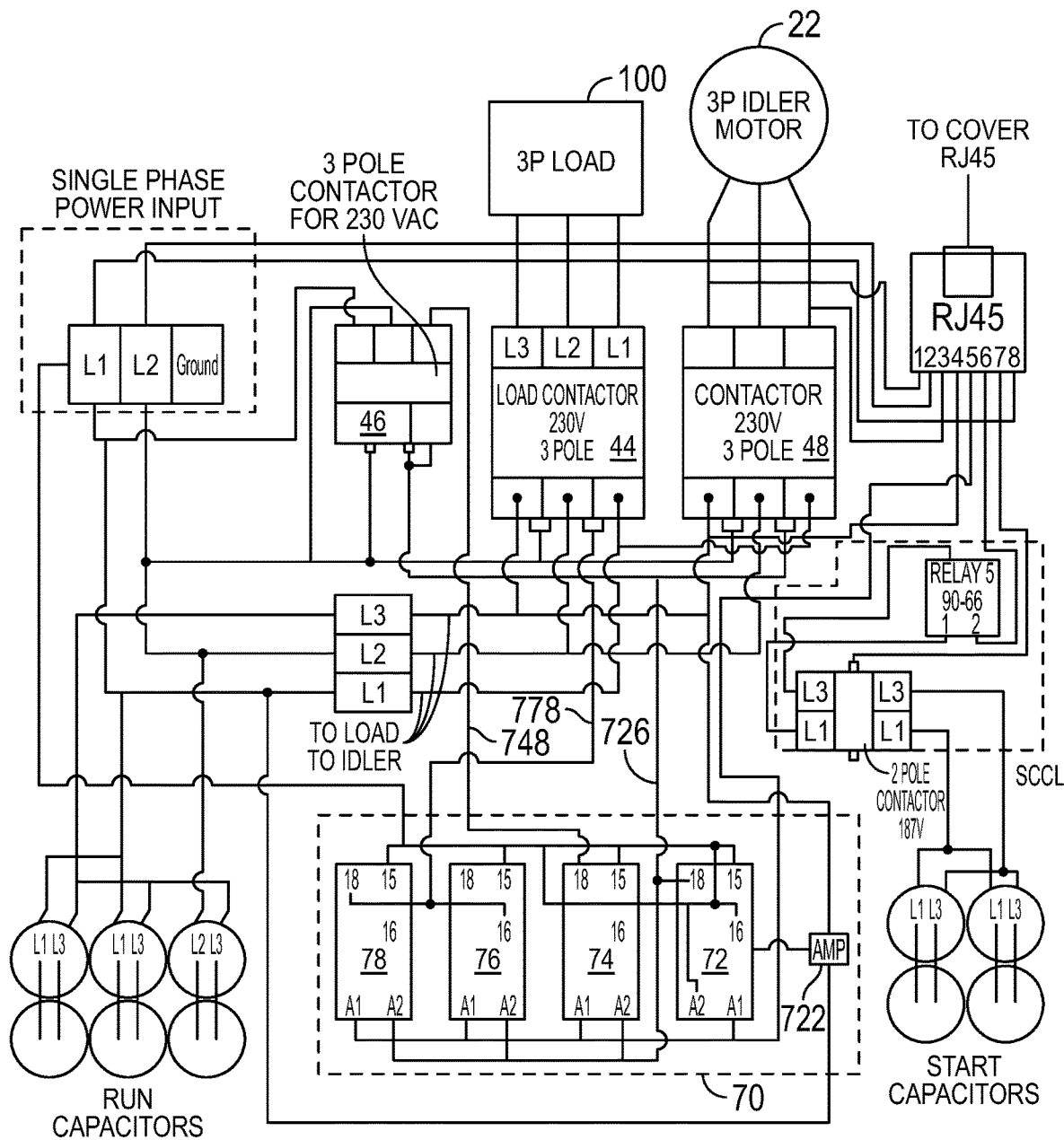
FIG. 3 illustrates an automatic and/or processor controllable relay and contactor logic circuit to detect power demand from a three phase load, temporarily switch out or disconnect the three phase load, start up an idler motor, and reconnect the three phase load after a delay or after the generation of sufficient power on the third phase or leg.
Figure 4:
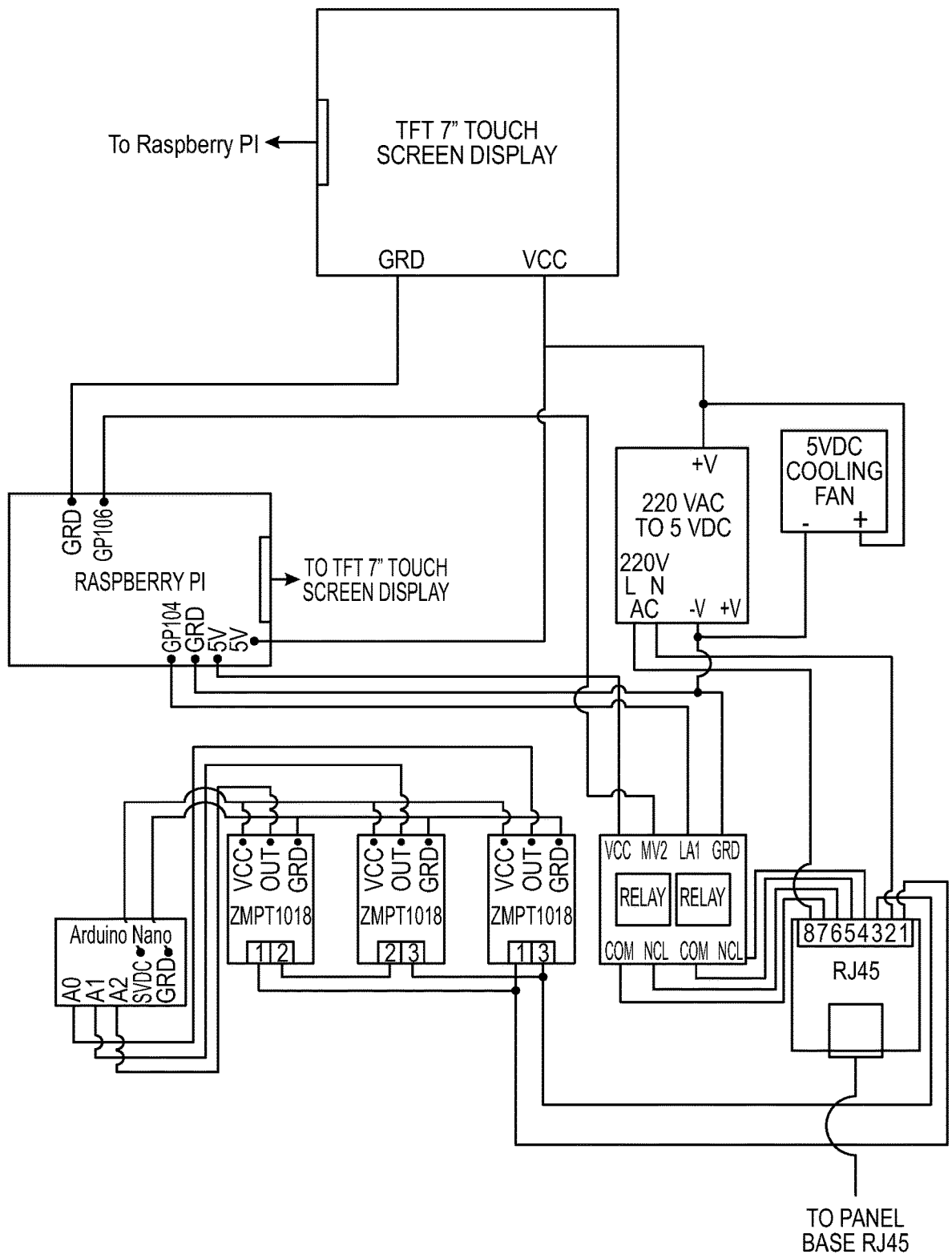
FIG. 4 illustrates an optional processor control circuit that may be coupled into the relay and contactor logic circuit to enable remote monitoring, control, and circuit performance or specification adjustment.

One such practical implementation is illustrated in FIGS. 3 and 4—a preferred embodiment of a self-starting phase converter system. FIG. 3 illustrates a fully functional self-starting single-phase to three phase conversion system and FIG. 4 illustrates an optional processor circuit that may be coupled to the circuit in FIG. 3 to implement additional "smart" features or optional capabilities for the self-starting single phase to three phase conversion system in FIG. 3.

In general terms, the system of FIG. 3 includes sensor and control logic 70 with a sensor and control logic signals 724, 726, and 728, a load contactor 44, a holding contactor 46, an idler motor contactor 48, a plurality of run capacitors, a plurality of start capacitors with associated start capacitor control logic SCCL, and an electro-mechanical connector (e.g. RJ45 Jack) to connect with a complimentary electro-mechanical connector coupled to the processor that may be operationally coupled to the system of FIG. 3 to enhance the capabilities of the system. The system of FIG. 3 may be coupled to single-phase or split-phase power with hot or line conductors coupled to L1 and L2, respectively, and the neutral conductor connected to system ground. The terminals of a three phase load 100 is respectively connectable to the terminals of the load contactor 44 and the terminals of a three phase idler motor 22 are respectively connectable to the terminals of the idler motor contactor 48.

Figure 5:
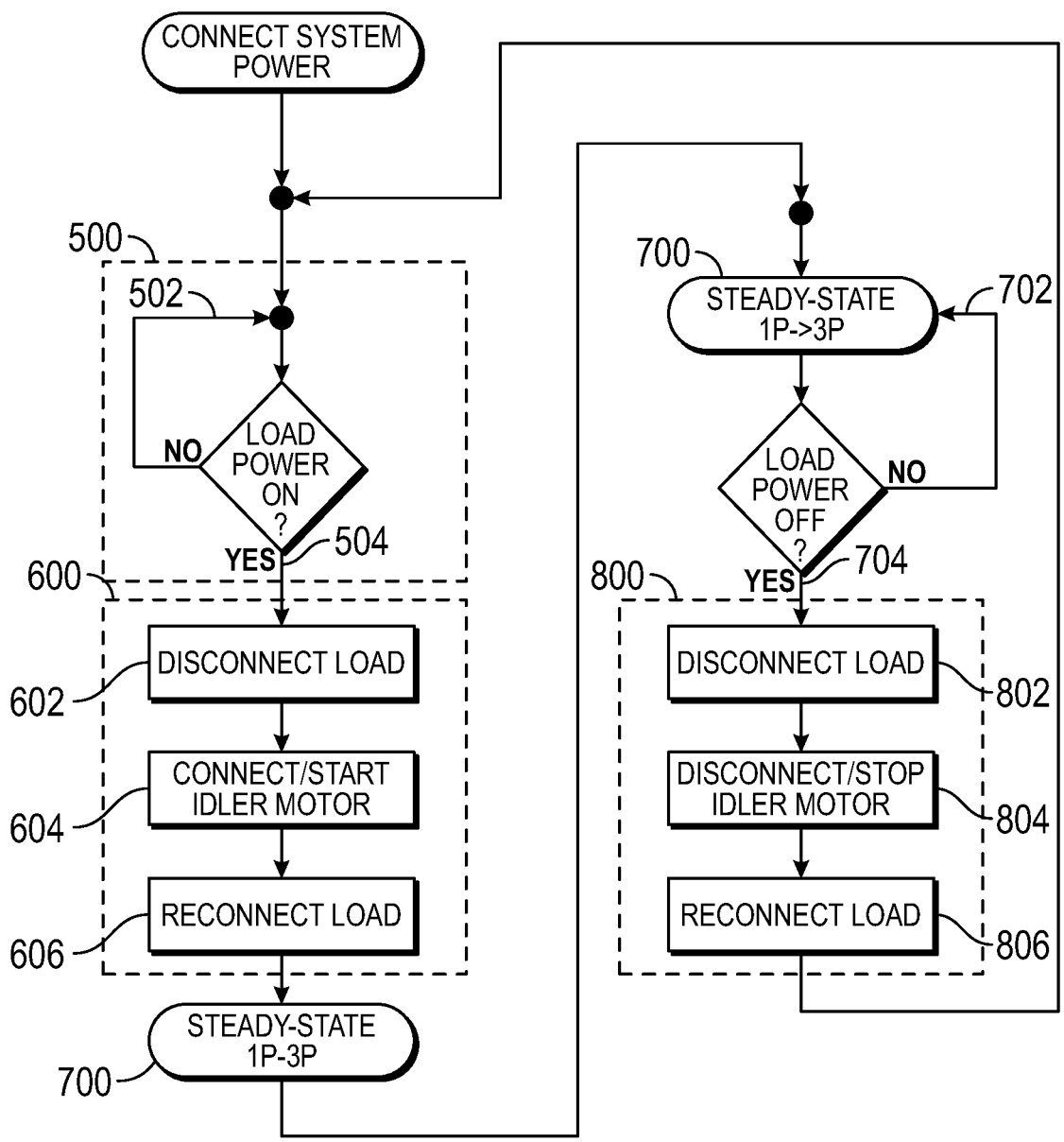
FIG. 5 illustrates a flow diagram of a process of operating a self-starting single phase to three phase conversion systems enabled by the embodiment.

The circuit of FIG. 3 enables a process of self-starting or automatically starting a single phase to three phase power conversion system. See FIG. 5. Connection of the system to single-phase power puts the system in a "stand-by" or "ready" state 500 wherein the sensor and control logic 70 is sensing the three phase load 100 for detection of a power demand and remains 502 in the stand-by state until the sensor and control logic 70 detects a power demand 504. Upon the sensor and control logic 70 detection of a power demand from the three phase load 100, the system transitions to a "start-up" state 600 wherein the sensor and control logic 70 disconnects the three phase load 602 and then starts up the idler motor 604. After the idler motor 22 has started, the sensor and control logic 70 then respectively reconnects the three phase load to system power 606 and the system transitions into single-phase to three-phase operating state 700. Finally, if the sensor and control logic 70 detects the absence of power demand from the three phase load 100, system undergoes a shut-down sequence 800 whereby the sensor and control logic 70 disconnects the three phase load 100 and the idler motor 22 from system power and the self-starting single phase to three phase conversion systems returns to the stand-by or ready state 500. The process may be implemented by the circuit in FIG. 3.

The sensor and control logic 70 includes a sensor 722 that detects power demand from the three phase load 100 and control logic sub-circuit outputs 778, 726, and 748, that change state upon sensed power demand from the three phase load 100. The sensor and control logic 70 may be implemented with any of a variety hardware and software or of integrated or discrete components. One such implementation is as illustrated in FIG. 3 and includes sensor and control logic 70 comprised of a plurality of sensing and timer relays 72, 74, 76, and 78 interconnected to sense power demand from the three phase load 100 and as a result, disconnect the three phase load 100 from system power, start the idler motor 22, and then reconnect the three phase load 100 to system power. Disconnection of the three phase load 100 and starting of the idler motor 22 may be by unbiasing load contactor 44 and biasing a idler motor contactor 48, and reconnection of the three phase load 100 may be by biasing of a load contactor 44 that was previously and temporarily unbiased. In more detailed terms, the operation of the sensing and timer relays 72, 74, 76, and 78 and the load contactor 44 and the idler motor contactor 48 may be as follows.

Sensing relay 72 may be a single phase current monitoring relay such as a PRI-32, with control inputs A1 and A2, Common (C), Normally Closed (NC) and Normally Open (NC) terminals, and an integral current monitoring current transformer 722. The sensing relay control inputs A1 and A2 may be coupled to system single-phase power, L2 and L1, respectively, and the sensing relay current transformer 722 operatively coupled to one of the terminals of the three phase load, such as the system conductor L3 that is coupled to the third phase terminal of the three phase load 100 through the load contactor 44. LI is also connectable to A2 and to the C and NC terminals. The NO terminal may comprise the control logic sub-circuit output 724. During "stand-by" conditions, the load contactor 44 control terminals are biased by connection of the load contactor 44 control terminals to L2 and to the C terminal of timing relay 76 via output 778. The sensing relay current transformer 722 is monitoring L3 for power demand or current sourced to the three phase load 100 through the load contactor 44.

If current demand as sensed by the current transformer 722 on L3 is less than the programmed or set threshold, sensing relay 72 will remain in the "off" state and NO=L2, the idler motor contactor 48 control terminals will remain unbiased and the idler motor 22 disconnected from L1, L2, and L3, the timer relays 74, 76, and 78 will remain in the "off" state and the timer relay 76 terminals C=L1, which biases the load contactor 44 and couples the three phase load 100 terminals to LI and L2 and L3. On the other hand, if the three phase load 100 demands power from the single phase source that exceeds the programmed or set threshold, sensing relay 72 will detect said power demand and energize or bias the timer relays 74, 76, and 78 to the "on" state and bias the control terminal of the holding contactor 46, which will thereafter hold or maintain the bias at the idler motor contactor 48 control terminal and the "on" or biased state of timer relays 74, 76, and 78 since timing relay 76 will unbias the load contactor 44 control terminals to disconnect the three phase load 100 that momentarily disconnects the three phase load from single phase power and ceases its 100 power demand and changes the state of sensing relay 72 back to its original state as a result. Thereafter, the idler motor contactor 48 control terminals remain biased via the potential on timing relay output 748 (and line 726 via the path though holding contactor 46) to connect the idler motor 22 terminals to single-phase system power L1 and L2, and the start and run capacitors to develop the third phase power on L3. After sufficient time as elapsed, timing relay 78 (via output 778) biases the load contactor 44 control terminals and reconnects the three phase load 100 terminals to system terminals LI and L2 and L3, respectively, and the system operates in a steady-state single phase to three phase conversion mode until power demand from the three phase load 100 is no longer detected by the sensing relay 72. Moreover, provided that the three phase load 100 continues to demand power, the sensing relay 72 will hold the system in the steady-state single phase to three phase conversion mode. Thereafter, if the three phase load 100 senses the lost demand power from the three phase load 100 (e.g. the three phase load 100 is powered off), the sensing relay 72 will detect the absence of power demand (i.e. via current transformer 722) and cause timing relays 74, 76, and 78 to revert to the unbiased state, unbias the idler motor contactor 48 control terminals, and bias the load contactor 44 control terminals to connect the three phase load 100 to L1 and L2 until the power demand is again sensed by the current transformer 722 of the sensing relay 72.

It should be readily obvious to a person of ordinary skill that the circuit represented in the described embodiments may be accomplished with a variety of hardware and software and include mechanical or solid state relays, switches, or contactors, with built in sensors or with discrete sensors, or with sensors implemented in software and A/D or D/A converters. And moreover that the implementation of the circuit and devices used may be varied based on the desire of the designer and still have the equivalent functions described. Accordingly, the described and illustrated embodiments are but examples intended to describe operation of the function of the self-starting phase converter and it should be understood that it is presented by way of example only, and not limitation. Thus, the breadth and scope of a preferred embodiment should not be limited by any of the above-described embodiments, but should be defined only in accordance with the claims and their equivalents in any follow up applications claiming benefit of this or related applications.

The invention claimed is:

1. A single phase to three phase converter circuit, comprising:
 a single phase power input;
 a three phase load switch with first, second, and third load switch input and output terminals and a load switch control terminal, the first, second, and third load switch input terminals coupled to the single phase power input;
 an idler motor switch with first, second, and third phase idler motor switch input terminals and output terminals and an idler motor switch control terminal, the first, second, and third phase idler motor switch input terminals coupled to the single phase power input;
 a sensor coupled to at least one of the first, second, and third load switch input and output terminals, the sensor configured to detect load power demand on at least one of the terminals;
 a first control signal that is operatively coupled to the load switch control terminal;
 a second control signal that is operatively coupled to the idler motor switch control terminal;
 wherein a three phase load is connectable to the single phase to three phase converter circuit and the first control signal controls the load switch control terminal to disconnect and connect the three phase load to the converter circuit, and an idler motor is connectable to the idler motor switch and the second control signal controls the idler motor switch to connect and disconnect the idler motor to the converter circuit.

2. The converter circuit in claim 1 wherein,
the first control signal is an output of a first relay and the second control signal is an output of a second relay.

3. The converter circuit in claim 2 wherein,
the first relay is a timing relay and the second relay is a current sensing relay.

4. The converter circuit in claim 1 wherein,
the first control signal is an output of a processor.

5. The converter circuit in claim 1 wherein,
the sensor is selected from a Hall effect and current transformer sensor.

6. The converter circuit in claim 3 wherein,
the current sensing relay includes a current transformer operatively coupled to one of the first, second, and third load switch input and output terminals.

7. The converter circuit in claim 1 wherein,
the three phase load switch is a first three pole switch with a closed state and the idler motor switch is a second three pole switch with an open state.

8. The converter circuit in claim 1 wherein,
the three phase load switch is a first three pole switch with an open state and the idler motor switch is a second three pole switch with an closed state.

9. The converter circuit in claim 1 wherein,
the three phase load switch is a first three pole switch with an closed state and the idler motor switch is a second three pole switch with an closed state.

10. The converter circuit in claim 1 wherein,
the three phase load switch load switch comprises a three-pole contactor.

11. The converter circuit in claim 1 wherein,
the idler motor switch comprises a three-pole contactor.

12. A single phase to three phase converter circuit for auto-starting an idler motor, comprising:
a single phase power input;
a three phase load switch with first, second, and third load switch input and output terminals and a load switch control terminal, the first, second, and third load switch input terminals coupled to the single phase power input;
an idler motor switch with first, second, and third phase idler motor switch input terminals and output terminals and an idler motor switch control terminal, the first, second, and third phase idler motor switch input terminals coupled to the single phase power input;
a sensor coupled to at least one of the first, second, and third load switch output terminals, the sensor configured to detect load power demand on at least one of the first, second, and third load switch output terminals; and
a switch control circuit operatively coupled to the sensor, the load switch control terminal, and the idler motor switch control terminal;
wherein an idler motor has first, second, and third phase input terminals that are respectively connectible to the first, second, and third phase idler motor switch output terminals, and the switch control circuit controls the three phase load switch and the idler motor switch based on a detection of load power demand by the sensor.

13. The converter circuit in claim 12 wherein,
the three phase load switch is closed and the idler motor switch is open.

14. The converter circuit in claim 12 wherein,
the three phase load switch is closed and the idler motor switch is closed.

15. A method of converting single phase power to three phase power, comprising:
detecting a power demand on at least one of first, second, or third phase conductors that are connectable to a three phase load;
disconnecting the three phase load from the first, second, and third phase conductors upon detection of the demand for power;
starting an idler motor that is connectable to the first, second, or third phase conductors; and
connecting the three phase load to the first, second, or third phase conductors.

16. The method in claim 15 wherein,
disconnecting comprises opening a load switch electrically coupled between the first, second, or third phase conductors and the three phase load.

17. The method in claim 15 wherein,
detecting comprises sensing current through a current transformer operationally coupled to at least one of first, second, or third phase conductors.

18. The method in claim 15 wherein,
starting comprises closing an idler motor switch electrically coupled between the first, second, and third phase conductors and first, second, and third terminals of an idler motor, respectively.

19. The method in claim 15 wherein,
connecting comprises closing a load switch electrically coupled between the first, second, and third phase conductors and first, second, and third terminals of the three phase load, respectively.

20. The method in claim 15 further comprising,
detecting an absence of power demand on at least one of first, second, or third phase conductors that are connectable to a three phase load; and stopping the idler motor.

* * * * *